No. 797,044. PATENTED AUG. 15, 1905.
H. BURL.
CARRIER FOR PNEUMATIC SERVICE SYSTEMS.
APPLICATION FILED JAN. 4, 1904.

WITNESSES.
A. R. Larrabee
A. L. Messer

INVENTOR
Harry Burl

UNITED STATES PATENT OFFICE.

HARRY BURL, OF LONDON, ENGLAND, ASSIGNOR TO LAMSON CONSOLIDATED STORE SERVICE COMPANY, OF BOSTON, MASSACHUSETTS, A CORPORATION OF NEW JERSEY.

CARRIER FOR PNEUMATIC-SERVICE SYSTEMS.

No. 797,044.    Specification of Letters Patent.    Patented Aug. 15, 1905.

Application filed January 4, 1904. Serial No. 187,624.

*To all whom it may concern:*

Be it known that I, HARRY BURL, a subject of His Majesty the King of Great Britain, residing at London, England, have invented a certain new and useful Improvement in Carriers for Pneumatic-Service Systems, of which the following is a specification.

This invention relates to improvements in carriers for pneumatic-service systems, the object of same being to provide means for securing the usual felt or like rings or blocks forming the packing or air-check of the carrier in such a manner that said rings or blocks may be readily replaced when worn, the means employed also serving to secure together the inner and outer metal tubes or casings of which the body of the carrier is usually made.

Figure 1:
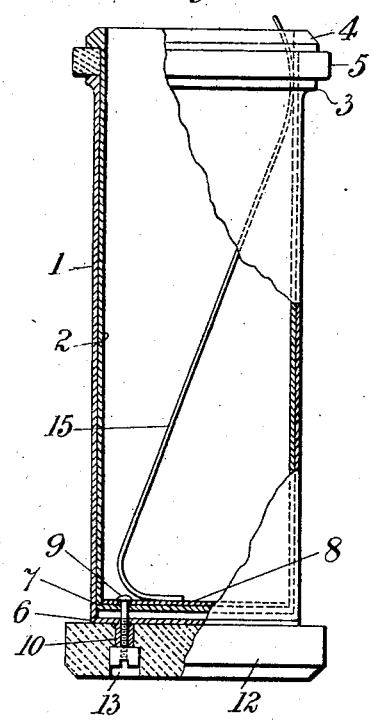
Figure 2:
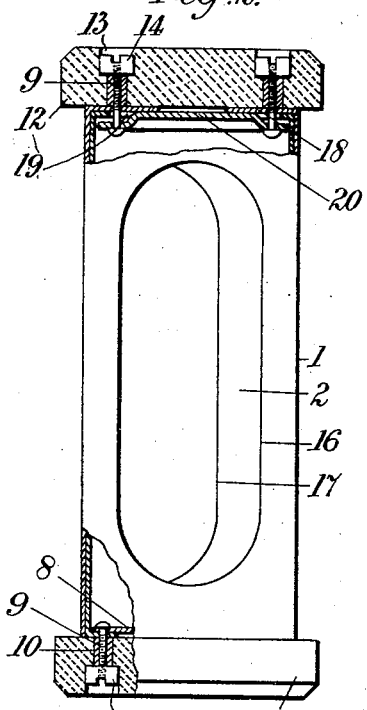
Figure 3:
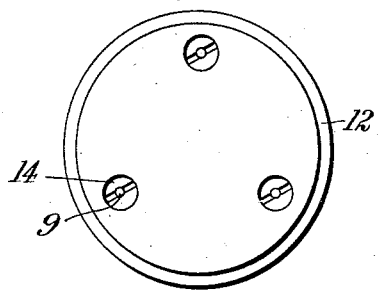
Figure 4:
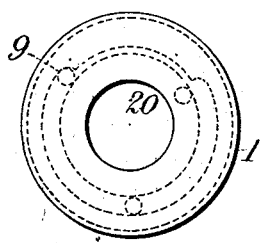
Figure 5:
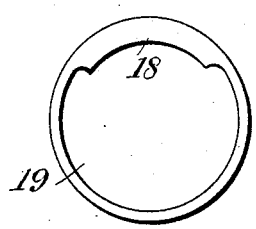
Figure 6:
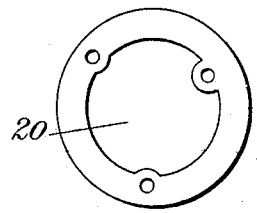

In the accompanying drawings, Figure 1 is a part-sectional elevation of a carrier of the open-ended type constructed in accordance with this invention. Fig. 2 is a similar view of a carrier of closed form. Fig. 3 is a plan view of a felt or other block forming an air-check. Fig. 4 is a plan view of one end of the closed carrier with the felt block removed. Fig. 5 is a plan view of one end of the inner tube, and Fig. 6 is a plan of the dished disk for carrying the screws at one end of the closed form of carrier.

Referring to Fig. 1, 1 is the outer tube, and 2 the inner tube, having at their open ends shoulders 3 and 4, respectively, between which is located the packing-ring 5, of felt or analogous material. The outer tube 1 is closed at 6, and the inner tube at that end is turned inward to form a shoulder 7, which rests upon the closed end 6 of the tube 1, and upon the inner face of said shoulder 7 rests a disk 8, which carries screws 9, said screws passing through the shoulder 7 of the inner tube 2 and projecting through the closed end 6 of the outer tube 1 and through metal sleeves or distance-pieces 10, which may be loose or may be screwed thereon or secured to the said outer end 6 by soldering or otherwise. The screws 9 and sleeves 10 pass into holes in the felt washer-block 12, which acts both as a buffer and air-check. The holes are countersunk, as shown at 13, on the outer surface for the reception of nuts 14, adapted to be tightened onto the said screws 9 to draw the parts closely together. The disk 8 may carry the usual spring 15, under which the written message is slipped and held in position during transmission.

In the closed form of carrier illustrated in the remaining figures of the drawings the outer tube 1 is arranged to rotate on the inner tube 2, and both are provided with side openings, respectively, 16 and 17, adapted to correspond or miss each other as the tubes are rotated to open or close the aperture.

A stop is provided for the tubes, so that when rotated they cannot be turned much more than enough in one direction to open the carrier and in the other direction to close the aperture. This stop is in the form of an inwardly-projecting shoulder 18, formed on the open end 19 of the inner tube 2, which is adapted to come in contact with two of the screws 9, which hold the parts together, said screws being offset for the purpose from the line of the other or others. A disk 20, which carries the screws 9, is provided at the same end and is dished, as shown, to form a distance-piece to prevent the two tubes 1 and 2 being too tightly screwed together. Each end of the carrier is in this case provided with the felt blocks 12.

In carriers so constructed the felt blocks 12 may be readily removed when worn and renewed without taking the carrier to pieces by simply removing the nuts 14 and drawing the blocks 12 off the screws 9 and distance-pieces 10. To remove the felt ring 5 in the open-ended carriers, the outer tube, however, must be drawn off the inner to separate the gripping-shoulders 3 4 after the nuts 14 are removed.

What I claim is—

1. In a carrier for pneumatic-despatch apparatus the combination with the body thereof, of a block forming an air-check, screws attaching same to said body, said block having countersunk holes to receive the ends of said screws, distance-pieces located in said countersunk holes, and nuts seating upon said distance-pieces and engaging said screws to hold the block to said body.

2. In a carrier for pneumatic-despatch apparatus the combination with inner and outer tubes forming the body thereof, of blocks forming air-checks, screws attaching same to said inner and outer tubes respectively, said blocks having countersunk holes to receive the ends of said screws, distance-pieces located in said countersunk holes and surrounding said screws, and nuts seating upon said distance-pieces and engaging said screws to draw said inner and outer tubes together and hold the blocks to same.

3. In a carrier for pneumatic-despatch apparatus the combination of an inner and an outer tube rotatable one upon the other and provided with side openings therein, means formed in one of said tubes and acting in conjunction with screw-heads for limiting the rotation of said inner and outer tubes, and a block forming an air-check removably secured by the same screws to the carrier-body.

4. In a carrier for pneumatic-despatch apparatus the combination of an inner and an outer tube rotatable one upon the other and provided with side openings, an inturned shoulder on one end of said inner tube forming a stop, a dished disk forming a distance-piece secured to same end of outer tube, screws passing outwardly through each end, sleeves on the projecting ends of said screws, blocks forming air-checks arranged at each end upon said sleeves, and nuts on said screws located in countersunk openings in said blocks to secure the parts.

In testimony whereof I have hereunto set my hand in the presence of two subscribing witnesses.

HARRY BURL.

Witnesses:
STEPHEN HERWIG,
PAUL KELLY.